United States Patent [19]
Bricheno et al.

[11] Patent Number: 4,591,372
[45] Date of Patent: May 27, 1986

[54] SINGLE MODE FIBRE DIRECTIONAL COUPLER MANUFACTURE

[75] Inventors: Terry Bricheno, Great Sampford; Alan Fielding; Nicholas A. Hewish, both of Harlow, all of England

[73] Assignee: Standard Telephones & Cables Public Ltd. Co., London, England

[21] Appl. No.: 675,559

[22] Filed: Nov. 28, 1984

[30] Foreign Application Priority Data

Nov. 30, 1983 [GB] United Kingdom ............... 8331950

[51] Int. Cl.$^4$ ............... C03B 23/04; G02B 5/172
[52] U.S. Cl. ............................. 65/4.2; 350/96.15
[58] Field of Search ............. 65/4.2, 4.3, 4.21; 350/96.15

[56] References Cited

U.S. PATENT DOCUMENTS

| 4,291,940 | 9/1981 | Kawasaki et al. ............... 350/96.15 |
| 4,377,403 | 3/1983 | McLandrich ..................... 65/3.11 |

FOREIGN PATENT DOCUMENTS

| 1118621 | 2/1982 | Canada . |
| 0079196 | 5/1983 | European Pat. Off. . |
| 0093460 | 11/1983 | European Pat. Off. . |
| 2839428 | 3/1980 | Fed. Rep. of Germany ... 350/95.15 |
| 2023874 | 1/1980 | United Kingdom . |
| 1600324 | 10/1981 | United Kingdom . |

OTHER PUBLICATIONS

'Biconical-Taper Single-Mode Fiber Coupler', B. S. Kawasaki et al., Optics Letters, vol. 6, No. 7, pp. 327-328 (Jul. 1981).
'Low-Loss Access Coupler for Multimode Optical Fiber Distribution Networks', B. S. Kawasaki et al., Applied Optics, vol. 16, No. 7, pp. 1794-1795, Jul. 1977.
'Analyse d'un Coupleur Bidirectional à Fibres Optiques Monomodes Fusionées', J. Bures et al., Applied Optics, vol. 22, No. 12, pp. 1918-1922 (Jun. 15, 1983).
Dyott, R. P., Electronics Letters, vol. 19, No. 16, Aug. 4, 1983, p. 601.

Primary Examiner—Kenneth M. Schor
Attorney, Agent, or Firm—Kerkam, Stowell, Kondracki & Clarke

[57] ABSTRACT

A method of making a single mode optical fibre directional coupler in which a pair of fibres (30,31) in side-by-side contact is subjected to a succession of drawing operations produced by traversing the fibres longitudinally through a flame (34) while stretching them between a pair of carriages (32,33) driven at slightly different speeds.

3 Claims, 6 Drawing Figures

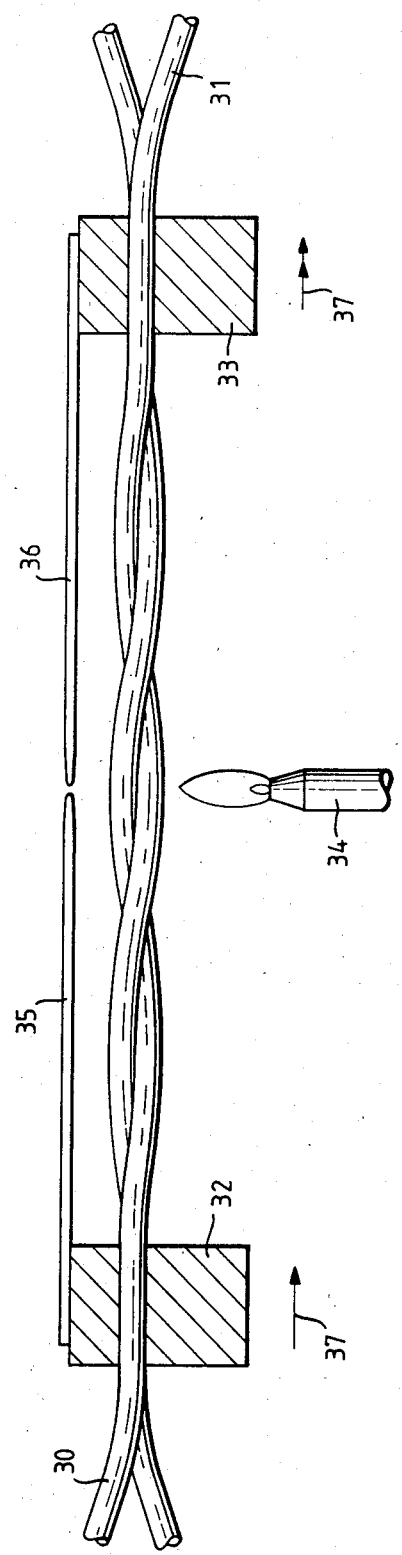

SINGLE MODE FIBRE DIRECTIONAL COUPLER MANUFACTURE

This invention relates to the manufacture of single mode fibre directional couplers.

In a directional coupler the field associated with the propagation of energy in one waveguide is arranged to overlap that of energy propagating in an adjacent waveguide so that an exchange of energy can take place between the two guides. In an optical waveguide one of the functions of the optical cladding is normally to distance the optical field from anything that might interact with it and thus provide a potential source of additional attenuation. In the manufacture of an optical fibre directional coupler this distancing effect of the cladding needs to be partially suppressed over a certain distance in order to provide a coupling region. One way of achieving this that has been described in the literature is by physical removal of a proportion of the cladding by etching and/or polishing. An alternative way that has also been described in the literature consists of using a drawing-down operation to reduce the diameter of the optical core. This reduction causes the optical field to expand, and clearly a condition eventually reached when a significant proportion of the energy extends beyond the confines of the cladding. In this context it will be noticed that an ancillary effect of the drawing operation required to reduce the core diameter will have been a corresponding reduction in cladding thickness. The manufacture of single mode optical fibre directional couplers by this drawing technique has been described by B. S. Kawasaki et al. in a paper entitled 'Biconical-taper single-mode fiber coupler', appearing in Optics Letters Vol. 6 No. 7 pp 327-8 (July 1981). The authors state the fabrication methodology to be essentially the same as that described by B. S. Kawasaki and K. O. Hill in a paper entitled 'Low-loss access coupler for multimode optical fiber distribution networks' appearing in Applied Optics Vo. 16 No. 7 pp 1794–5 (July 1977). This involves twisting together two fibres so that they are held in side-by-side contact with each other, mounting the fibres under spring tension in a jig, and then using a microtorch flame to soften and fuse the fibres so that the spring elongates the fibres in the softened region to form twin biconical tapers with a total length of approximately 1 cm.

We have tried to use this method for the production of single mode fibre directional couplers, but have found that the size and shape of the smallest part of the biconical taper is so critical in the determination of the resulting coupling characteristics of the directional coupler that the method appears far from suited to commercial scale manufacture.

The present invention concerns an alternative drawing method of making fibre directional couplers that is more readily controllable than the above referenced method and produces a longer coupling region. The increased length of the coupling region means that its cross-sectional area is correspondingly larger. This is advantageous because the light is therefore less weakly guided and hence less susceptible to the effects of environmental strain. Moreover the effects of any applied environmental stress are not so heavily concentrated into a short zone.

According to the present invention there is provided a method of making a single mode fibre directional coupler, wherein a plurality of glass single mode optical fibres held in side-by-side contact with each other are subjected to a plurality of progressive stretching operations to produce the requisite optical coupling strength between the fibres, in each of which operations the fibres are axially stretched at a controlled rate while being moved axially relative to a heat source that provides a localised zone within which a region of the fibres is sufficiently heat-softened to allow plastic flow stretching of the fibres to occur within this zone.

There follows a description of a method of making directional couplers embodying the invention in a preferred form. For purposes of comparison, this description is prefaced with a description relating to a typical result obtained when the translation feature of the present invention was not employed. Hereafter such a method will be referred to as a 'static flame method'. The description refers to the accompanying drawings in which:

FIG. 3 is a schematic representation of the apparatus of the present invention.

Figure 1:
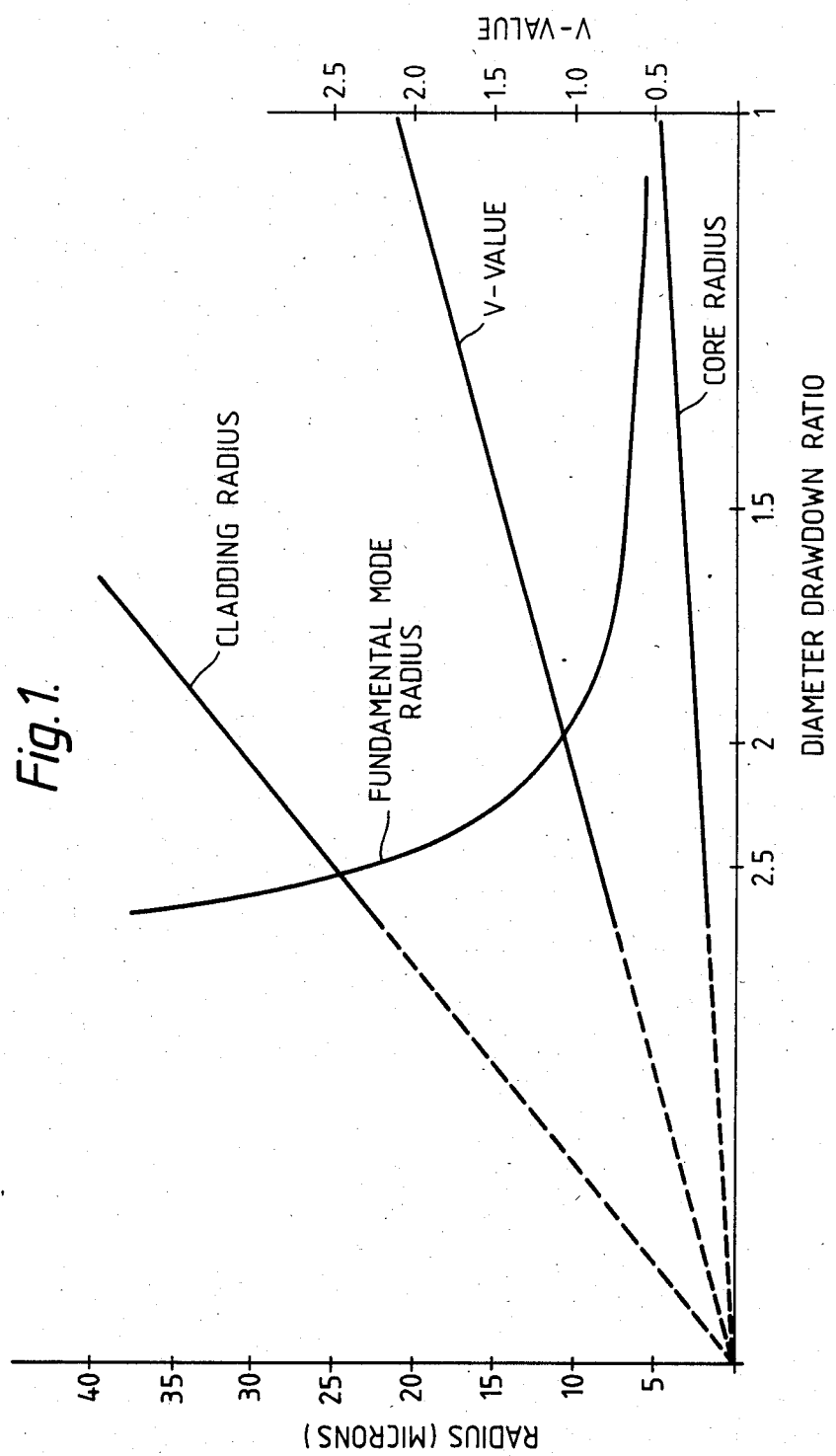
FIG. 1 depicts the effects upon the V-value and fundamental mode radius of the single mode fibre that are produced by drawing-down its diameter.

The confinement of the optical field of the fundamental guided mode of an optical fibre is related to the V-value of that fibre by the relationship $$-\lambda V = 2\pi a(n_1^2 - n_2^2)^{1/2} -.$$

where $\lambda$ is the wavelength, a is the core radius and $n_1$ and $n_2$ are respectively the core and cladding refractive indices. From this formula it is clear that if a length of optical fibre is subjected to a drawing operation to reduce its diameter the V-value will diminish. Such a reduction in V-value is accompanied by an increase in the fundamental mode radius (defined as the radius enclosing $1-e^{-2}$ of the total power). These effects are depicted in FIG. 1 for a typical single mode fibre designed for operation at 1.3 microns. This fibre has a core diameter of 9 microns and a cladding diameter of 125 microns. At the operating wavelength of 1.3 microns its core and cladding refractive indices are respectively 1.480 and 1.447, and hence the V-value of this fibre lies between 2.1 and 2.2. FIG. 1 shows that the power does not begin to spread appreciably till, by drawing down the fibre to about half its original diameter (diameter draw down ratio of 2), the V-value has been reduced to about 1. However, it is also seen that, by the time a draw down ratio of 2.5 is reached, the fundamental mode radius is expanding very rapidly indeed and is about to rise above the diminishing value of the cladding radius. Clearly once this stage is reached quite small changes in draw down ratio will have a major effect upon the coupling between the two fibres of a directional coupler.

Figure 2:
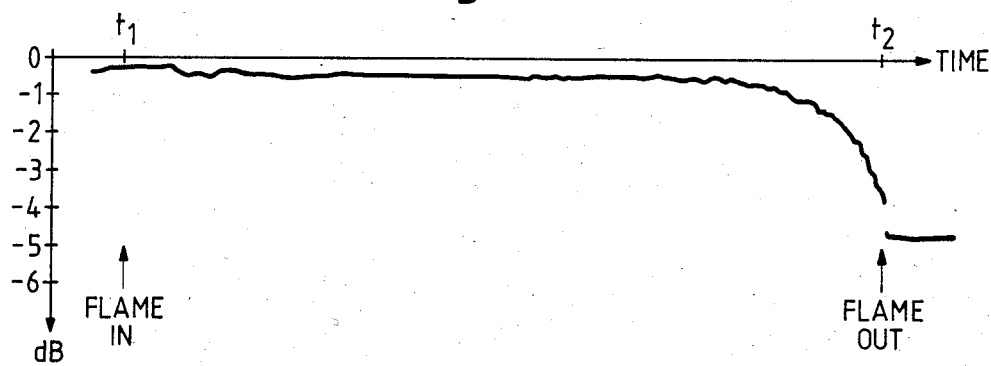
FIG. 2 depicts the change of power coupling between two single mode fibres produced when a biconical coupler is made using a balanced drawing operation in conjunction with a static flame.

FIG. 2 is a graph showing the observed variation in coupled power during the making of a directional coupler by symmetrically tapering down a pair of twisted fibres using a static flame method. In the making of this coupler the twisted pair of fibres was locally heated with a stationary microtorch flame while the ends were moved apart at a constant rate to produce a biconical taper. Light was launched into one end of one of the fibres, and the light output from the other end of that fibre was monitored to provide a trace which records the power output as a function of time. The flame was applied at time 1, after which the drawing down operation proceeded at a linear extension rate of between 100 and 200 microns per second until time $t_2$, at which the output had dropped by just less than 3.5 dB, whereupon the extension was halted and the flame extinguished. As predicted, the initial stages of extension produced substantially no coupling between the fibres. However, once coupling did become apparent, it proceeded at an ever increasing rate at least as far as the 3 dB point. At this stage the tapered region rapidly cooled upon extinction of the flame, and the loss increased by a further 1 dB. It is the rapidity of onset of coupling that makes this particular method of making a coupler so difficult to control in such a way as to terminate the drawing operation at the appropriate end point. This problem of control becomes progressively worse as couplers are pulled that require the stronger coupling factors necessary to exploit their spectral properties in the manufacture of wavelength multiplexers and demultiplexers. Simply slowing down the extension rate used in the drawing process does not help matters to any significant extent because the longer the heat-softened thinned fibre is left in the flame the greater is the risk of it sagging or becoming blown awry by the flame. Any localised bending of this nature causes unacceptably high losses resulting from the weak guiding associated with low V-value in this region. Associated with this problem is the further problem resulting from the significant change in coupling that occurs on removal of the flame and the consequent cooling of the coupling from about 1800° C. to room temperature.

An attempt to reduce the scale of the first problem by trying to lengthen the region of the draw down zone by the use of a fishtail flame was found to be largely ineffective. It is believed that the reason for this was that the temperature profile of a fishtail flame will evitably produce one or more local hot spots at which the fibres draw down faster than at other points. The resulting regions of smaller diameter cannot conduct the heat away as fast as larger diameter regions, and hence a runaway condition is created with the result that once again the coupling is effectively confined to a short region of strong coupling.

Turning attention now to the preferred method of the present invention, and referring to FIG. 3, two single mode glass optical fibres 30, 31 from which any traces of plastics cladding have been removed are twisted together to hold their surfaces in side-by-side contact over at least a portion of a region between two independently driven blocks 32 and 33 to which the fibres are securely clamped. The clamping is arranged so that the axis of the twisted pair of fibres is accurately aligned with the direction of motion of the two blocks. Between these two blocks is located a microtorch 34 whose flame provides localised heating of the fibres 30, 31. This microtorch is fixed in position.

The blocks 32, 33 holding the ends of the fibres are driven in the same direction but at different speeds. The leading block is always driven slightly faster than the trailing block so that the fibres are subjected to a progressive extension as they are scanned through the flame of the microtorch. This process is analogous to the pulling of optical fibre from a preform, but whereas in fibre production the draw down typically involves a linear scale reduction in the region of 200, in the present instance a scale reduction of about 1% or not much more than a few percent is desirable. Several traverses are then required to produce the requisite amount of coupling. The blocks are driven at speeds typically lying in the range of 5 to 10 mm per minute. For good control of speed to about 0.25% it is preferred to drive each block with its own digitally controlled servo-motor incorporating a shaft-encoder in its feedback loop. The preferred way of providing successive traverses is, on termination of each traverse, to reverse the rotation sense of both motors and, at the same time to change their relative rotational rates so that the block that was formerly the trailing block is now driven faster than the other block because it has assumed the function of the leading block. Thus successive traverses take place in opposite directions. Usually the rotational rates will simply be interchanged at the end of each traverse so as to give the same rate of extension for the succeeding traverse, but at least one change of extension rate may be employed. This is so that a relatively faster rate may be used for the first few traverses before the onset of any appreciable coupling, and then a slower rate of extension is employed to permit greater control over determining precisely when to halt the process. Flame ignition is approximately synchronised with motor start-up, and similarly flame extinction is approximately synchronised with the halting of the motors. In this context it should be appreciated that the motor start-up can safely lead the flame ignition by a few moments since the extension rate is small having regard to the elastic strain that the cold fibres can tolerate. Similarly flame extinction can safely lead motor shut-down.

The momentary dwell of the flame that is associated with each reversal of the motors may produce the trace of an undesirable neck in the draw-down profile. The optical effects of any potential neck of this sort can be reduced or eliminated by ensuring that the later traverses are made sufficiently longer than the initial ones to terminate well up the shoulders produced by the ends of these initial traverses in regions where there is effectively no coupling between the fibres. (The traverses must however be confined to the region where the two fibres are in contact with each other, so as to avoid any risk that the flame would allow a swan-neck to form in either fibre.) A convenient way of monitoring the extension process is to position, before the start, a pointer 35, 36 on each block so that they meet in the plane of the microtorch flame. At the end of the first traverse, assumed to be in the direction of arrows 37, the tips of the two pointers will have moved apart, and the pointer 35 will intersect the plane of the microtorch. On the second traverse the flame reaches the end of the reduced diameter portion produced by the first traverse when the tip of pointer 36 again reaches the plane of the microtorch.

In the production of a typical simple 3 dB coupler the blocks may start 5 to 8 cm apart, and typically four or five traverses are employed to produce an extension of between 2 to 5 cm. The production of a coupler for multiplex applications requires tighter optical coupling between the fibres, and will therefore generally involve more traverses and a greater extension.

Figure 4:
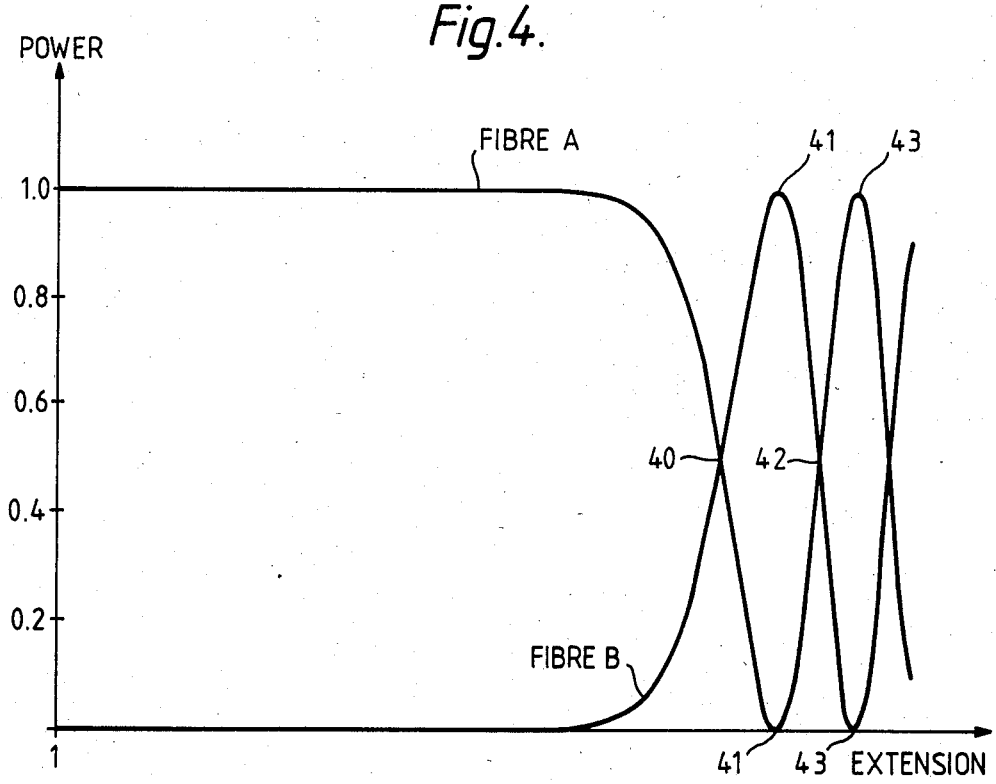
FIG. 4 depicts how coupling between two fibres varies as a function of fibre extension.

The manufacturing process is monitored by directing light of a particular wavelength into one end of one of the fibres and observing the changes in light output from the other end of either or both fibres as the extension proceeds. It is found that light launched into one end of one fibre, fibre A, is initially transferred virtually exclusively to the output from fibre A because the coupling is too weak for there to be any appreciable transfer of power into the second fibre, fibre B. Then, as the extension proceeds, and the coupling gets stronger, the output from fibre A decreases while there is a corresponding increase in the power output from fibre B. In due course the 3 dB point 40 of FIG. 4 is reached, at which the power output is equally divided between the two fibres. Then as coupling is increased still further to enter the domain of over coupling, the output from fibre A is diminished until the power is transferred totally to fibre B as represented by the points 41. A further increase of coupling brings more power back into the output from fibre A until, after passing through a second 3 dB point 42, power emerges exclusively from the output of fibre A as represented by points 43. After this, a continued increase in coupling starts the whole cycle over again, with the power output oscillating between output from fibre A and output from fibre B.

Figure 5:
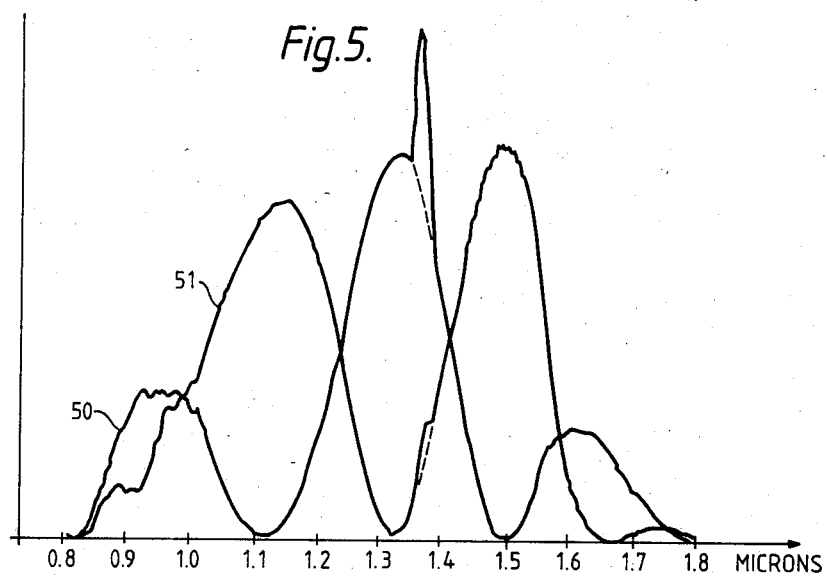
FIGS. 5 and 6 depict the spectral characteristics of two couplers made by the method of the present invention.
Figure 6:
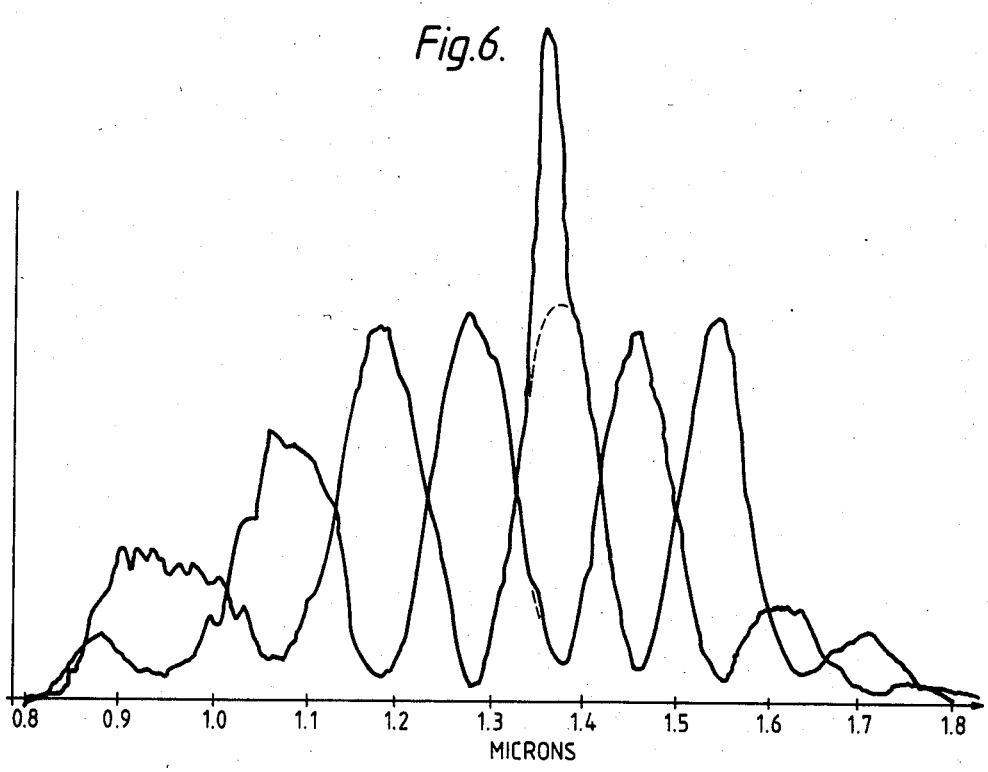

The coupling strength of any particular configuration of coupler depends upon the coupler geometry, the V-values of the fibres within the coupling region, and the length of that region. The V-values depend not only upon fibre geometry and refractive indices, but also upon wavelength. Therefore, neglecting the effects of material dispersion, coupling strength can be expected to increase with wavelength. This wavelength dependence can be employed, by suitable device of geometry, to form devices for wavelength multiplexed optical systems. Thus FIG. 5 shows the spectral characteristics of a coupler produced by the method described with particular reference to FIG. 3 and designed for multiplexing or demultiplexing signals at 1.33 and 1.5 microns. To obtain these characteristics light from an incandescent filament was directed into a grating monochromator, and the input end of one fibre was held in fixed position at the monochromator output. A cladding modes stripper was interposed between this end of the fibre and the coupling region because this light launching arrangement inevitably involves the launching of unwanted cladding modes into the fibre in association with the wanted core mode. This particular arrangement of incandescent filament and monochromator provided a light source that could be tracked in wavelength from its short wavelength cut off in the region of 0.8 microns to its long wavelength cut off in the region of 1.8 microns. Trace 50 was obtained by monitoring the light output from the other end of the fibre into which the light was originally launched, while trace 51 was obtained by monitoring the output from the other fibre of the coupler. The first 3 dB point is seen to occur at a wavelength in the region of about 1.0 microns, though the picture is slightly confused by the effects of higher order modes which are not cut-off till about 1.2 microns. (This coupler is thus seen to be an overcoupled single mode fibre coupler, i.e. a coupler for which the coupling is so strong that the first 3 dB coupling point occurs at a wavelength shorter than the higher order modes cut-off). In second 3 dB point occurs in the region of 1.22 microns, and almost no power is seen to be transferred from the first fibre to the other in the region of 1.32 microns. At about 1.34 microns the picture is again slightly confused, this time by a spurious spike appearing in the output of the monochromator. At a wavelength of about 1.5 microns the launched power is seen to be transferred to be virtually completely transferred from the first fibre to the second. Thus this device is seen to be capable of acting as a multiplexer or as a demultiplexer in a system operating at the two wavelengths of 1.32 and 1.55 microns. The position on the spectrum of the first 3 dB point and the spacing between this and subsequent 3 dB points can be altered by modifying the geometry and length of the coupling region. Thus whereas the coupler of FIG. 5 has 3 dB points separated by approximately 0.2 microns that of another coupler whose spectral characteristic is depicted in FIG. 6 exhibits a separation of approximately 0.1 microns.

In the manufacture of these couplers the main advantages of the use of the differential pulling technique of the present invention include the feature that the rate of tapering can be made very slow, being limited only by the degree of control over motor speed, and hence good control of the end point is possible. In this context it is to be noted that the coupling region can be spread over a significant length of uniformly pulled fibre, and hence the application or removal of the localised heating provided by the microtorch has a proportionately smaller effect upon the end point since at any one time the flame is heating not the whole coupling region but only a small proportion of it. Additionally the extended coupling region is to be preferred because the coupling strength per unit length is less. This means that the V-values of the component fibres are higher, and hence the fibres are less susceptible to bending loss. Also it means that there is no sharply localised neck in the structure at which strain resulting from misalignment is liable to be concentrated. Both these factors ease the problems of designing a housing for the coupler that will make the optical performance of the resulting package relatively insensitive to strains of mechanical or thermal origin.

Although the foregoing specific description has been related exclusively to couplers made from pairs of optical fibres, it will be evident that the invention is applicable also to couplers made from more than two fibres. Thus the invention is applicable to the manufacture of three-fibre couplers for the type of application described in the paper by K. P. Koo entitled 'Performance Characteristics of a Passively Stabilised Fibre Interferometer using a (3×3) Fibre Directional Coupler' appearing in Proceedings of 1st International Conference on Optical Fibre Sensors, London 26–28 April, 1983.

It has already been explained that the reason for requiring the fibres to be in side-by-side contact with each other over the entire drawing-down region is to ensure that the application of localised heating does not induce the formation of a swan-neck. In the foregoing specific description of couplers the necessary contact has been achieved by twisting the component fibres together, but it should be understood that this is not the only way of achieving this end. Thus an alternative method involves threading the fibres through a length of glass sleeving, and then locally heating that sleeving with a traversing heat source, such as the microtorch flame, to cause the sleeving to soften and collapse around the fibres under the effects of surface tension.

It will also be evident that it is not essential for the localised heat source to be stationary in order to achieve the relative movement required for the performance of the invention. However, in general a stationary heat source is preferred because this simplifies the drive arrangements for the other components of the drawing apparatus.

We claim:

1. A method of making a single mode fibre directional coupler, wherein a plurality of glass single mode optical fibres held in side-by-side contact with each other are subjected to a plurality of progressive stretching operations to produce the requisite optical coupling strength between the fibres, in each of which operations the fibres are axially stretched at a controlled rate by moving two spaced ends on the fibres axially in the same direction relative to a heat source but at different speeds such that the leading end moves at a faster rate relative to the heat source than does the trailing end, the heat source providing a localized zone within which a region of the fibres is sufficiently heat-softened to allow plastic flow stretching of the fibres to occur within this zone, said direction relative to the heat source being periodically reversed in order to carry out the progressive stretching operations of the process.

2. A method as claimed in claim 1, wherein the fibres are initially held in contact with each other by being twisted about each other.

3. A method as claimed in claim 1, wherein the fibres are initially held in contact with each other by heating a glass sleeve placed around the fibres to soften it and cause it to collapse onto the fibres.

* * * * *